Virgil Pace
George W. Pace
Inventors

Patented June 17, 1952

2,600,800

UNITED STATES PATENT OFFICE 2,600,800

CYLINDER SLEEVE ROLLER

Virgil Pace and George W. Pace, Hattiesburg, Miss., assignors to Pace Tool Manufacturing Co., Inc., Hattiesburg, Miss.

Application August 14, 1946, Serial No. 690,576

2 Claims. (Cl. 29—90)

Our present invention relates to an improved cylinder sleeve roller and especially to a device for use in removing the ring grooves formed by the piston rings in sleeved cylinders of automobiles, trucks and tractors employing cylinder sleeves. The device of our invention eliminates the need for honing the cylinder sleeves and permits a faster and more economical reconditioning of the sleeves so that the pistons may be readily removed.

In the accompanying drawings we have illustrated one complete example of the physical embodiment of our invention according to the best mode we have thus far devised, but it will be understood that various changes and alterations may be made in the exemplified structure within the scope of the appended claims.

Figure 1:
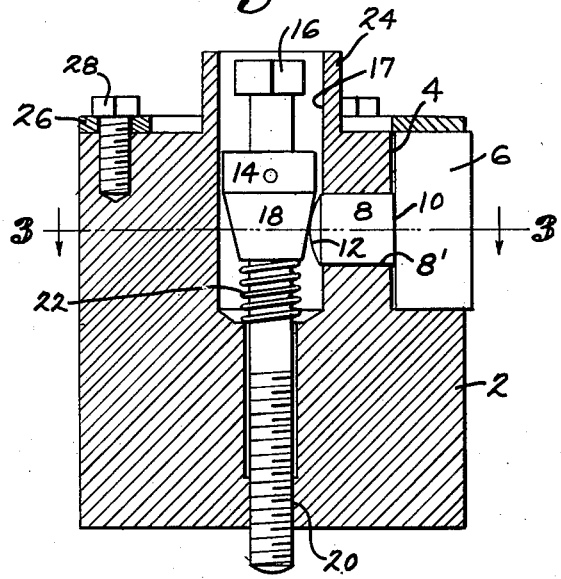
Fig. 1 is a vertical sectional view of the sleeve roller of the invention.
Figure 2:
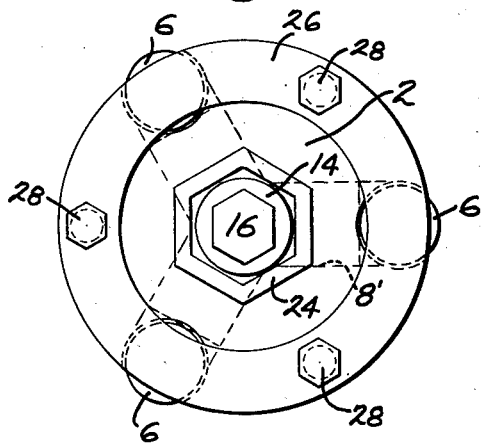
Fig. 2 is a top plan view thereof.
Figure 3:
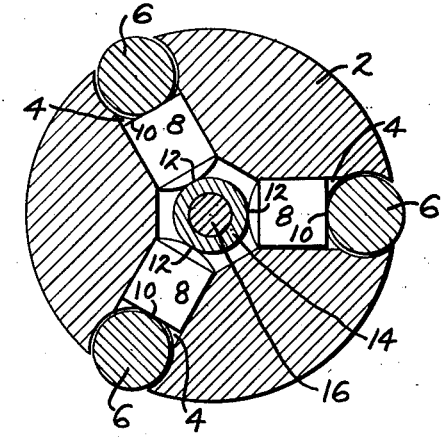
Fig. 3 is a horizontal sectional view at line 3—3 of Fig. 1.

Referring now to the drawings wherein like characters indicate like parts, we have illustrated the present embodiment of our invention as comprising a cylindrical body 2 formed with vertical partly cylindrical recesses 4 to secure and retain the cylindrical rollers 6 which extend beyond the periphery of the body 2.

Formed axially in the body 2 and extending through one end thereof is an internally screw threaded bore 20 and a bore 17 of somewhat larger diameter which opens through the opposite end of the body and communicates with the screw threaded bore. Formed in the body between the recesses 4 and the larger bore 17 are radially extending openings 8' in which radially extending pawls 8 are mounted to slide. The outer ends of the pawls 8 lie in planes perpendicular to the axes of the pawls to form a line contact with the rollers 6 while the opposite ends of the pawls are convex as at 12. The pawls are of slightly greater length than the thickness of the wall of the body 2 between the recesses 6 and the bore 17. Extending through and threadedly engaging the threaded bore 20 of the body 2 is an elongated externally screw threaded stud which extends into the bore 17 and is provided with a head 16 within said bore having flat faces for engagement by a wrench by means of which the stud may be turned and moved longitudinally within the threaded opening 20. Carried by the stud within the bore 17 is a cone having its reduced end disposed toward the threaded opening 20, and interposed between the cone 20 within the bore 17 in encircling relation with the stud is a compression coil spring 22, one end of which bears on the body 2 while its opposite end engages the cone 18 to offer resistance to turning of the stud and thereby hold the cone in various adjusted positions within the bore 17. As illustrated in Fig. 1, the convex ends 12 of the pawls 8 contact the cone 18 so that as the stud is turned to advance the cone toward the threaded opening 20 of the body 2, the tapered sides of the cone will engage the convex ends of the pawls to move the pawls radially in their respective openings and thereby cause the rollers 6 to move outwardly relative to the body 2. By reason of the convex ends on the pawls 8 it will be evident that only point contact with the cone is effected between the pawls and the tapered surface of the cone.

A hexagonal collar 24 extending from the body receives a suitable tool, not shown, for rotating the body 2. A retaining ring 26 is secured by bolts 28 which ring permits the removal or replacement of the rollers 6.

In use it will be evident that with the stud turned to fully retract the cone 18, the rollers 6 may be pressed inwardly relative to the body 2 to permit the insertion of the tool into the cylinder sleeve to be dressed. After having thus positioned the tool in place in the cylinder sleeve, the stud is turned by the application of a suitable tool to the head 16 thereof to advance the cone 18 toward the threaded opening 20 and thus cause the pawls 8 to move outwardly in their respective recesses 8' and force the rollers 6 outwardly and into contact with the wall of the sleeve to be dressed. Upon the application of a tool to the collar 24, the body 2 may be rotated so that the rollers 6 bearing against the sleeve will press it outwardly. Obviously by further rotating the stud to advance the cone, the pressure of the rollers 6 on the sleeve to be dressed may be increased. By reason of the spring 22, and its bearing on the body 2 and cone 18 danger of the stud turning without the application of a direct turning effort on the head thereof will be avoided and hence the cone 18 will remain in any selected position until the stud is deliberately turned.

Having thus fully described our invention what we claim as new and desire to secure by Letters Patent is:

1. A tool for reconditioning internal circular cylindrical bores comprising an elongated circular cylindrical body having an axial internally screw threaded bore opening through one end thereof and an axial bore of larger diameter communicating with the first mentioned bore and opening through the opposite end of the body, said body having peripherally spaced elongated concave recesses opening through its periphery, the axes of said recesses lying parallel to the axis of the bores, said body having radial openings extending therethrough which communicate with the larger bore and with the recesses intermediate the ends thereof, rollers mounted in the peripherally spaced recesses for rotary and radial movement relative to the body, a stud extending through the threaded bore and threadedly engaging the threads in said bore, a flat sided head carried by the stud within the larger bore for turning the stud, a cone carried by the stud within the larger bore between the head and the threaded bore for movement with said stud toward and away from the threaded bore, elongated cylindrical pawls mounted in the radial openings between the cone and engaging the cone and the rollers for moving the rollers outwardly within the recesses as the cone is advanced by the stud toward the threaded bore, a spring encircling the stud between the cone and the threaded bore and bearing on the body and on the cone for offering resistance to the turning of the stud relative to the body, a collar carried by and extending longitudinally from the body at the end thereof remote from the threaded bore in concentric relation to the longitudinal axis of the body, and flat faces on the exterior of the collar for engagement by a wrench.

2. The structure defined in claim 1 in which the ends of the pawls which engage the rollers are perpendicular to the axes of the pawls to produce only line contact with the rollers, and the ends of the pawls which engage the cone being convex to produce only point contact with the cone.

VIRGIL PACE.
GEORGE W. PACE.

REFERENCES CITED

The following references are of record in the file of this patent:

UNITED STATES PATENTS

| Number | Name | Date |
| --- | --- | --- |
| 683,291 | Johnson | Sept. 24, 1901 |
| 958,517 | Mettler | May 17, 1910 |
| 1,312,333 | Lebow | Aug. 5, 1919 |
| 1,794,797 | Rockwell | Mar. 3, 1931 |
| 2,170,631 | Cogsdill | Aug. 22, 1939 |
| 2,291,899 | Jones | Aug. 4, 1942 |

FOREIGN PATENTS

| Number | Country | Date |
| --- | --- | --- |
| 30,774 | Great Britain | Dec. 30, 1897 |
| 529,517 | France | May 17, 1910 |
| 529,166 | France | Sept. 3, 1921 |
| 640,072 | France | Mar. 19, 1928 |